United States Patent [19]

Tandon et al.

[11] 4,160,315

[45] Jul. 10, 1979

[54] METHOD OF MAKING A MAGNETIC HEAD ASSEMBLY

[75] Inventors: Sirjang L. Tandon, Northridge; John P. Moon, Thousand Oaks, both of Calif.

[73] Assignee: Tandon Magnetics Corporation, Chatsworth, Calif.

[21] Appl. No.: 896,635

[22] Filed: Apr. 17, 1978

[51] Int. Cl.² .............................................. G11B 5/42
[52] U.S. Cl. ..................................... 29/603; 360/103; 360/118
[58] Field of Search .................. 29/603; 360/102, 103, 360/118, 122, 125, 127

[56] References Cited

U.S. PATENT DOCUMENTS

| | | | |
|---|---|---|---|
| 3,789,505 | 2/1974 | Huntt | 29/603 |
| 3,964,103 | 6/1976 | Thompson et al. | 360/118 X |

*Primary Examiner*—Carl E. Hall
*Attorney, Agent, or Firm*—Fraser and Bogucki

[57] ABSTRACT

In methods of making head assemblies, a ceramic slider having a row of receiving apertures is united with a multiple serial ferrite arch structure shaped in complementary fashion so that successive arches thereof register within the apertures to define erase pole pieces. The face of the resulting assembly is ground flat and parallel to the arch base and the bridges thus formed on the base side may be separated between the arches. The assembly is then bisected along the row of pole pieces into complementary halves, and the facing surfaces are ground and lapped to provide a desired width for the erase member formed by the pole piece half and associated leg of one of the ferrite arches. Grooves are cut into the bisected surfaces at the pole pieces to define the erase track width and the erase gap length for the erase member. A read/write magnetic head structure is separately batch fabricated in the form of core strips, with side faces that are precisely parallel and smooth, and this is unified in a magnetic head assembly between pairs of opposite erase members embedded in the slider halves. Thereafter, the serial assembly is sectioned into individual heads, and the magnetic circuits completed for the read/write head and the erase head.

19 Claims, 12 Drawing Figures

METHOD OF MAKING A MAGNETIC HEAD ASSEMBLY

BACKGROUND OF THE INVENTION

1. History of the Invention

The present invention relates to magnetic head assemblies, and more particularly to magnetic head assemblies having a read/write head mounted in a ceramic slider body and straddled by an opposite pair of erase core elements.

2. History of the Prior Art

Advancing technology in the magnetic recording area has resulted in various noncontact recording schemes to provide various advantages such as higher data transfer rates. In such schemes the head assembly is supported by a self-acting sliding or air bearing relative to a moving record member such as a magnetic disk. The disk itself may be of the rigid type, or it may be flexible. With rigid disk systems the head is "flown" above the disk on an air bearing layer which may be small but is still measurable and the magnetic interchange is effected by noncontact recording. In the great majority of flexible disk systems the spacing is much more intimate and the magnetic interchange is referred to as being effected by contact, even though a very thin film of air may exist between the head and disk.

In flexible disk systems such as those in which the magnetic medium comprises a flexible Mylar substrate having magnetic layers (the so-called "floppy" disks) to provide the recording surfaces, the magnetic read/write transducers are disposed very close to or in contact with the recording surfaces even though mounted in a fluid bearing type of slider body. To limit the width of the track written by the read/write transducers, the magnetic head assembly may include erase transducers positioned on opposite sides of the read/write transducer to erase the edges of the track immediately after it is written. An example of such a magnetic head assembly which is commonly referred to as a straddle erase head is provided by U.S. Pat. No. 3,964,103 to Thompson et al.

In the Thompson et al patent the magnetic head assembly is made from a ceramic slider having a pair of orthogonal slots and a trough therein. After a read/write core and a pair of erase pole pieces are placed in the opposite slots and glass rods are placed in the trough, the assembly is heated to melt the glass and bond the core and pole pieces in place prior to installation of coils and a side bar to complete the magnetic circuit. In still other prior art arrangements the straddle erase pole pieces are mounted in place within a slider assembly using other materials and techniques such as epoxy bonding.

While prior art straddle erase head assemblies have provided a reasonably effective way of storing and retrieving information from recording mediums such as a flexible magnetic disk, such assemblies suffer from a number of problems. One problem is the relatively high cost of the head assemblies stemming from the need to use individual head assembly processes. Other factors contributing to high cost include the cost of components such as erase elements and the low yields involved even though heads commonly assembled individually.

Of at least equal importance to the problems of assembly costs are those relating to accurate dimensioning and positioning of the various elements within the head assembly. These heads, and their component parts, are now extremely small and dimensional tolerances and part alignment represent significant quality control problems. The width of the erase head and the dimension of the erase gap must desirably be controlled within ranges measured in ten thousandths of an inch and microinches respectively. Poor control of the length of the erase gap between the read/write core and the erase core element is a common problem resulting from conventional fabrication techniques and one which can seriously affect the performance of the head assembly. Although there is some disparity in usage of the term within the industry, the "erase gap length" is here referred to as the dimension transversely across the nonmagnetic spacer in the erase head. A related problem involves poor control of the erase track width between the read/write core and the opposite edges of the erase core elements. Coupled with this problem is an inability to easily and therefore economically adjust the erase track width to accommodate different track densities. Further problems relate to precise definition and capability for adjustment of the erase gap height.

Most such dimensioning and positioning problems in conventional straddle erase heads result from head assembly designs and fabrication techniques which do not permit positive control over such parameters. For example, assembly methods such as the one disclosed in the Thompson et al patent which utilize glass bonding typically rely on gravity during the bonding process to hold the various core elements in place. As the glass becomes molten the core elements are often lifted out of place and tend to remain somewhat out of place as the glass hardens. The resulting displacement can seriously affect erase gap length and height and erase track width as well as other head assembly parameters. Any skewing or misalignment of one component relative to the others adversely affects the head characteristics, and does so in a way which results in undesirable variations in the manufactured heads. Similar problems arise where the various core elements are bonded in place using epoxy or other adhesives.

Accordingly, it would be advantageous to provide methods of making straddle erase magnetic head assemblies which are economical and which readily lend themselves to batch fabrication techniques.

It would furthermore be advantageous to provide straddle erase head assemblies and methods of making the same which provide for the positive control of parameters such as erase gap length and height and erase track width, while at the same time permitting substantial variation in such parameters, if desired to meet different application requirements.

BRIEF DESCRIPTION OF THE INVENTION

The present invention provides a magnetic head assembly and methods of making the same in which straddle erase head assemblies can be made relatively economically using batch fabrication techniques where desired while maintaining close control over parameters such as erase gap length and height and erase track width but at the same time permitting substantial variations in such parameters to be selectable for different applications.

These advantages are realized by initially forming an assembly in which the plural arches of a structure of ferrite or like magnetic material are registered within the different apertures of a ceramic slider using high temperature bonding materials. Thereafter faces of the assembly may be ground flat and parallel to the base of the ferrite arches to provide precise references for the gap height and gap height location of the pole pieces eventually formed by parts of the ferrite arches.

The assembly is then bisected along an axis through the apertures of the ceramic slider so as to divide the ferrite arches longitudinally and form an opposite pair of side faces perpendicular to the surface recording plane of the assembly. The opposed faces are ground, slotted, and lapped to a desired flatness and smoothness in preparation for being disposed against and bonded to the opposite sides of a series of read/write core elements formed as a flat sided comb structure. The read/write core element is created by bonding together like shaped sections of ferrite with high temperature glass to form a laminate and then slicing the laminate into read/write core strips so that each strip comprises a series of read/write gaps between pairs of core legs. The grinding, slotting and lapping of the side faces of the separated assembly halves provide very precise control of other parameters of the eventual head assembly including erase gap length and erase track width. In addition the erase track width and erase gap length are selectively variable within a wide range for a given assembly size and configuration. By grinding and lapping each side face prior to joining such to assembly halves to a strip or comb of interposed read/write cores, precise control of the erase track width is achieved for each of the erase heads simultaneously. In addition the erase track width can be made variable over a substantial range, simply by removing more or less material. Also, prior to joining the separated halves of an assembly to the opposite sides of a read/write core strip, slots are formed into the opposing side faces at each of the ferrite pole pieces to form erase gaps of specific and controlled length. The depth (i.e. gap length) for each of the erase heads may be precisely controlled relative to the adjacent reference surfaces. The slots are eventually filled with non-magnetic material after the assembly halves are joined to the strip of read/write cores. The multi-head assembly is sliced into individual heads with each head then being mounted in a housing and provided with coils and bridging magnetic elements to complete the magnetic circuits. The face of each head assembly may be lapped and polished to provide desired gap heights and a desired surface finish.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
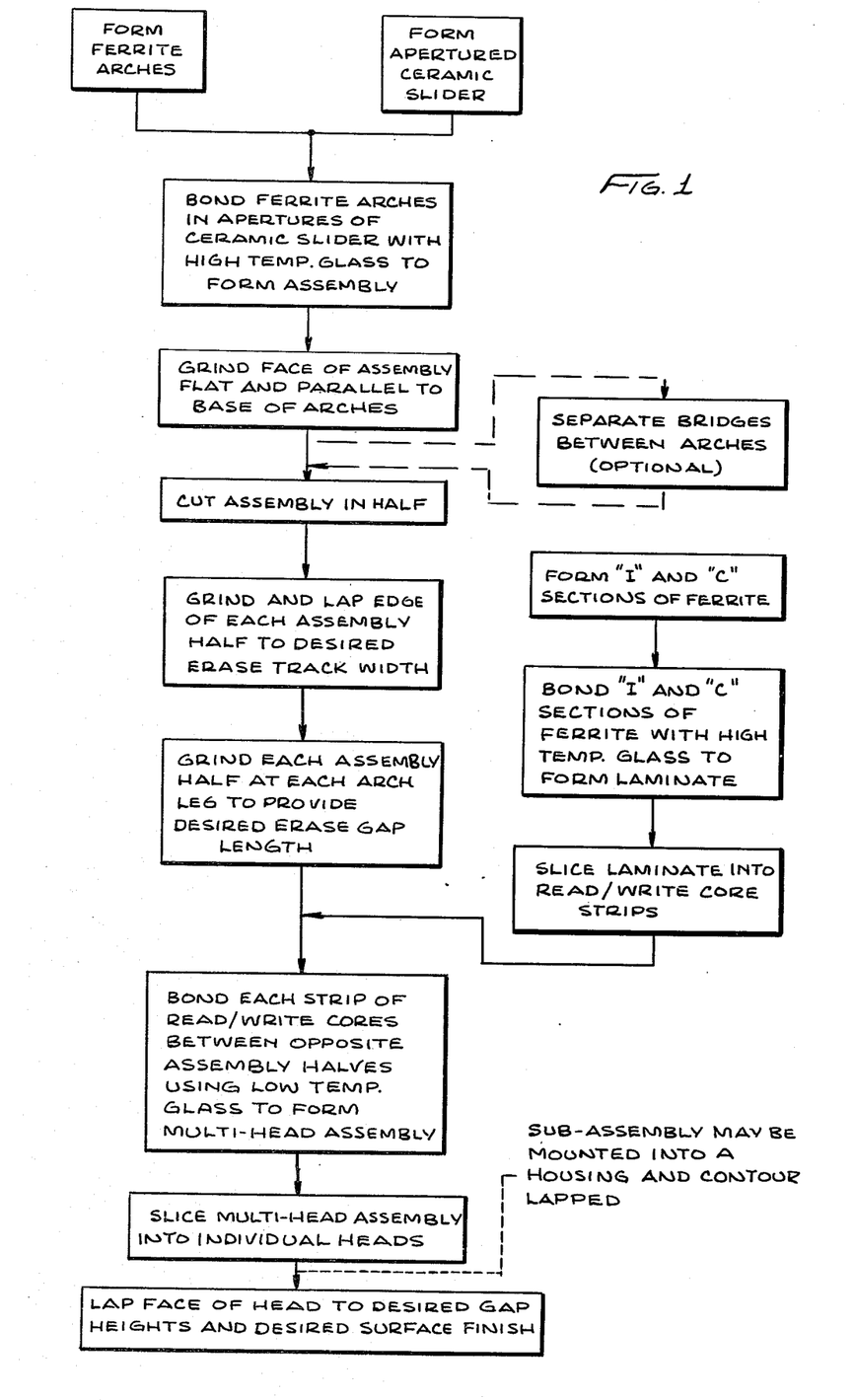
FIG. 1 is a block diagram of the successive steps in a preferred method of making a magnetic head assembly according to the invention.

FIG. 1 comprises a block diagram of the successive steps of one preferred method of making a magnetic head assembly in accordance with the invention. FIG. 1 will be discussed in conjunction with FIGS. 2–12 which depict various structures used in carrying out the method of FIG. 1.

Figures 2, 3:
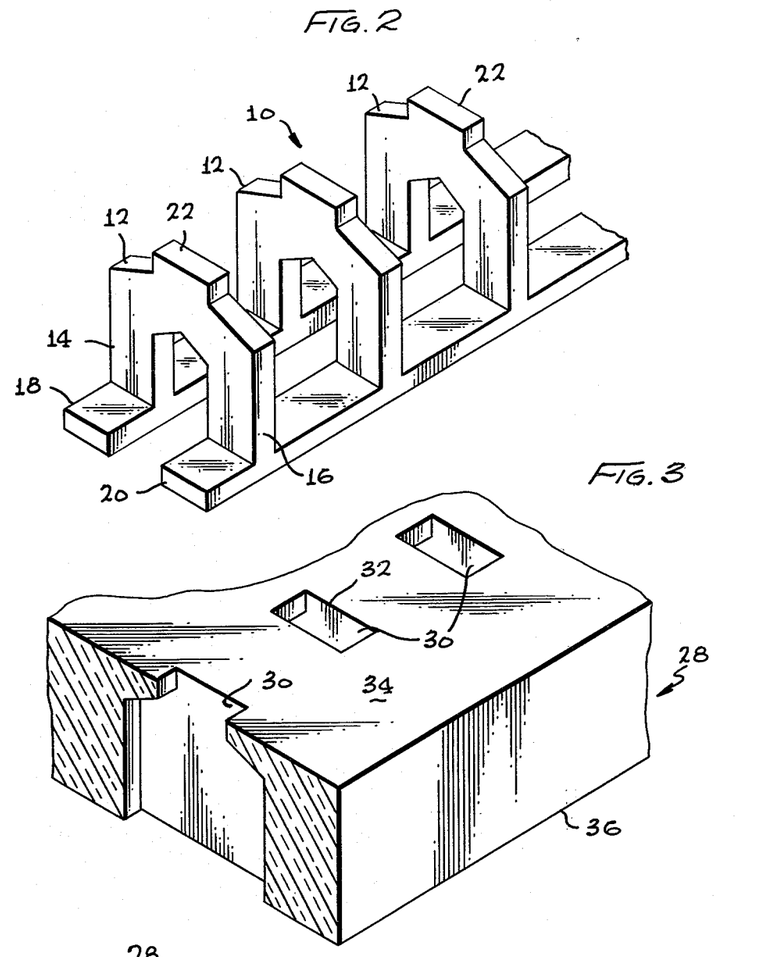
FIG. 2 is a perspective view of an assembly of ferrite arches used in the method of FIG. 1.
FIG. 3 is a perspective view of a ceramic slider used in the method of FIG. 1.

The method of FIG. 1 is begun by forming a serial assembly 10 of arches 12, using ferrite or like magnetic material, disposed along a longitudinal axis as shown in FIG. 2. Each of the arches 12 has a like pair of opposite legs 14 and 16 extending upwardly from a pair of opposite bases 18 and 20 respectively. At the tops thereof, the opposite legs 14 and 16 extend toward one another and join so as to complete the arch 12 by forming a raised section or pole piece 22. The pole piece 22 actually is more than a double width element at this point. The various arches 12 are of like size and shape and the bases 18 and 20 are equidistantly spaced along the longitudinal axis. For ease of reference, the plane along which the end surfaces of the pole pieces 22 lie will be referred to as the recording plane.

The arch assembly 10 may be formed by machining a block of ferrite material to form teeth joined by the interconnecting bases 18 and 20 with the successive teeth thereafter being machined to form the arches 12. However for production purposes the arch assembly 10 is preferably molded to shape by conventional techniques. As described hereafter, the bisected halves of each pole piece 22 of an arch 12 eventually form opposite straddle erase core elements of a magnetic head assembly. The width of the pole piece 22 which is eventually bisected as described hereafter determines the range of dimensions that can be used in the subsequently formed erase gap lengths and the erase track widths. The height of the pole piece 22 determines the maximum gap height for the erase head. The distance from the bottom of the bases 18 and 20 to the underside of the center of the arches 12 can be used as a reference for further dimensioning.

At the same time that the arch assembly 10 of FIG. 2 is formed a ceramic slider 28 shown in FIG. 3 is formed. The slider 28 which is of relatively thin, generally planar, rectangular configuration is formed with a plurality of apertures 30 of like size and shape disposed in spaced-apart relation along a longitudinal axis. The apertures 30 are shaped internally like the exterior of the arches 12 so that each can receive and register with the outside surfaces of one of the arches 12. However, a top portion 32 of each aperture 30 is made slightly larger than the pole piece 22 of each arch 12 so that a bonding material such as molten glass can be disposed therebetween to attach the arches 12 within the apertures 30. The ceramic slider 28 is formed using an appropriate molding technique for forming abrasion resistant, dimensionally stable slider bodies such as by pressing and firing ceramic materials. Upon formation of the slider 28 a broad, flat face 34 thereof, corresponding to the recording plane, is lapped to make it flat. The opposite or underside broad surface 36 is also lapped to make it flat and parallel to the face 34 and to adjust the reference distance to the underside of the pole pieces 22 as desired.

Figure 4:
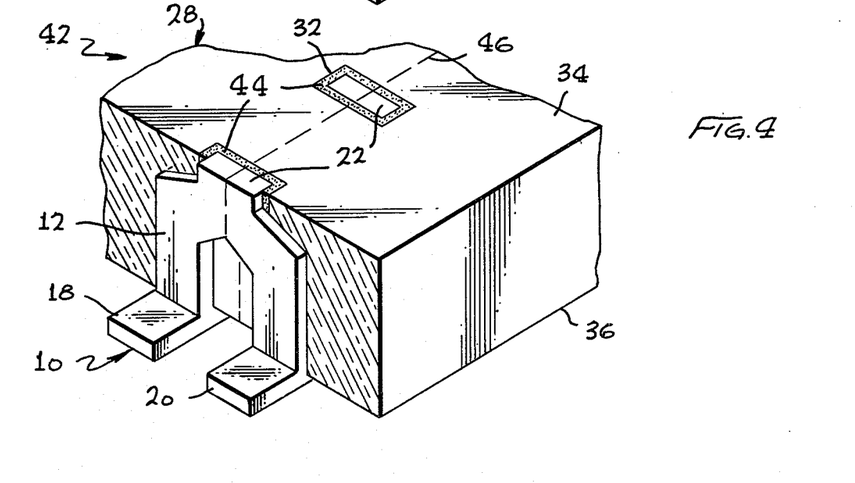
FIG. 4 is a perspective view of an assembly formed by bonding the ferrite arch arrangement of FIG. 2 in the ceramic slider of FIG. 3.

With the arch assembly 10 of FIG. 2 and the ceramic slider 28 of FIG. 3 formed and registered together, the ferrite arches 12 are bonded in the apertures 30 of the slider 28 to form an assembly 42 shown in FIG. 4. The arches 12 are placed within the apertures 30 so that the opposite bases 18 and 20 of the arch assembly 10 reside against the surface 36 of the ceramic slider 28. At this point a non-magnetic bonding agent such as glass 44 is flowed under high temperature into the spaces between the top portion 32 of each aperture 30 and the pole pieces 22 of each arch 12, wetting both the ferrite and the encompassing ceramic, and unifying the assembly upon hardening. The glass 44 or other bonding agent used therefor should soften and be workable only at relatively high temperatures so as to be unaffected by later processing after it hardens. A typical glass suited for this purpose has a softening point of 650° C. and a working temperature of 900° C. Following bonding of the arches 12 within the apertures 30, the face 34 of the slider 28 is again ground flat and parallel to the bases 18 and 20 of the arch assembly 10. The bridges of material between the bases 18 and 20 may optionally be segmented as shown in FIG. 5 to provide a desired envelope or configuration for subsequent mounting.

When the assembly 42 is completed it is bisected by cutting along the dashed longitudinal line 46 shown in FIG. 4 to form an opposite pair of complementary halves 48 and 50. The bisecting is performed by sawing or otherwise dividing the assembly 42 through the centers of the arches 12 and the apertures 30 and perpendicular to the opposite broad surfaces 34 and 36 of the slider 28.

Figures 5, 6:
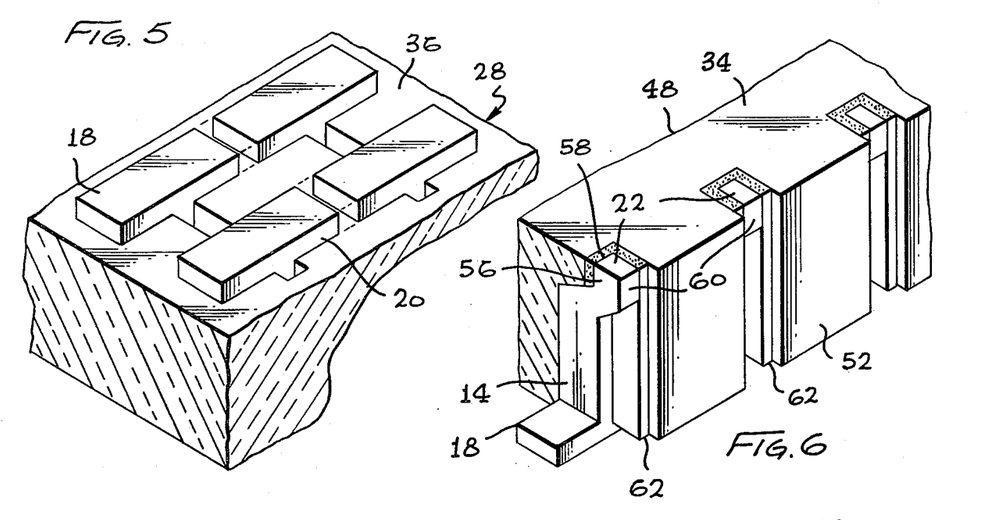
FIG. 5 is a perspective view of the underside of the assembly of FIG. 4, showing separation of the bridges between the arches.
FIG. 6 is a perspective view of one of the halves of the assembly of FIG. 4 following bisecting of the assembly and grinding, slotting and lapping at successive positions therealong.

The assembly half 48 is shown in FIG. 6 after it has been processed to provide both a desired erase track width and a desired erase gap length. Bisecting of the assembly 42 provides the assembly half 48 with a planar side face 52 perpendicular to the face 34 that defines the recording plane. Likewise, bisecting of the assembly 42 provides the other assembly half 50 with a planar side face 54 opposite the edge 52 and perpendicular to the face 34. The assembly half 48 includes the arch assembly base 18, the left leg 14 of each arch 12 and the left half of the pole piece 22 of each arch 12. The other assembly half 50 includes the base 20, the right leg 16 of each arch 12 and the right half of the pole piece 22 of each arch 12. Each arch leg forms a different erase core element having a pole tip 56 formed by the included half of the pole piece 22. Since the position of each arch 12 within each aperture 30 is precisely defined by the shape of the aperture and the arch bases 18 and 20, the grinding and lapping of the face 34 provides the pole tips 56 of the erase core elements with precisely defined gap heights that may be later reduced.

The distance between the side face 52 against which a read/write core element eventually resides and an opposite surface 58 at the opposite edge of each erase pole tip 56 defines the erase track width for one side of the straddle erase magnetic head assembly. This distance is determined precisely by removing material from the side face 52. The erase gap length is precisely determined thereafter by slotting or machining away the side face 52 at each pole tip 56, as well as a groove 62 of adjacent slider material on each side, to leave an inner face 60 on each pole tip 56. Thus, the distance between the side face 52 against which a read/write core element eventually resides and the indented surface 60 of each erase pole tip 56 precisely determines the erase gap length, as herein defined. Using the side face 52 as a precise reference plane the groove depths may be accurately controlled, and because the pole tips 56 are firmly secured no misalignment can result. Both assembly halves 48, 50 are prepared in the same way.

Figure 7:
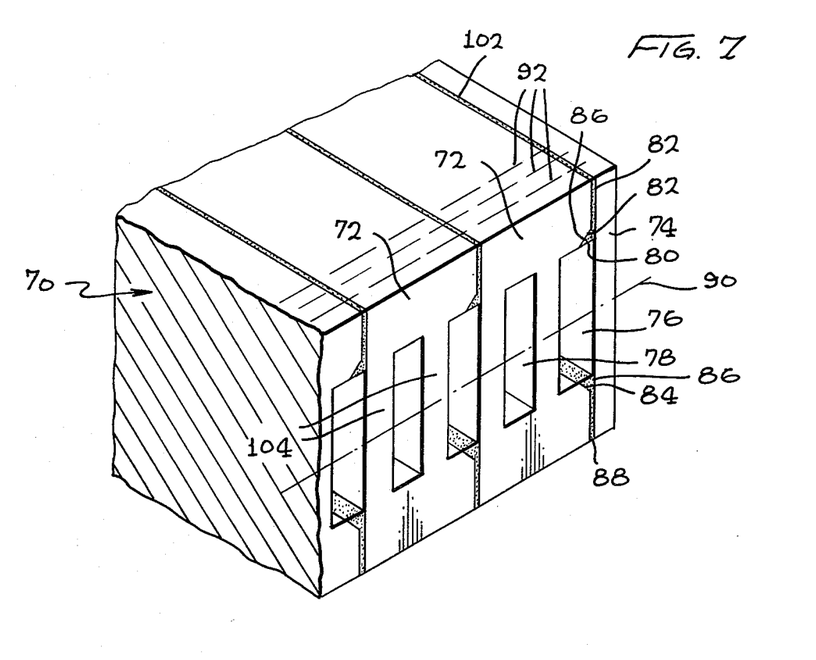
FIG. 7 is a perspective view of a laminate of ferrite elements used to make strips of read/write cores.

FIG. 7 depicts a laminate 70 of sections 72 made of ferrite or like magnetic material that is to serve as the basis for a plurality of read/write cores. With the exception of a bottom section 74 which is of thin, planar configuration, the remaining sections 72 are of like shape with each having two different apertures 76 and 78 therein. The ferrite sections 72 are bonded to each other using glass 80 or other appropriate bonding material. A pair of inner edges 82 and 84 of each ferrite section 72 are disposed at an angle of approximately 45° relative to the other broad surfaces of the section so that the glass 80 forms fillets 86 thereat joining thin portions 88 of the glass which ultimately provide the read/write gaps when the laminate 70 is sliced into strips and the strips are joined with the opposite halves 48 and 50 of an assembly 42.

When the laminate 70 is assembled as shown in FIG. 7, it is bisected by cutting along a dashed line 90 along the central axes of the apertures 76 and 78 through the thickness of the laminate 70. The laminate 70 is also repeatedly sliced across the width thereof as shown by dashed lines 92 which are equidistantly spaced from each other. The result is the formation of a plurality of strips or combs of read/write cores. One such strip 100 is shown in the exploded view of FIG. 8. The strip 100 has a plurality of read/write gaps 102 spaced along the length thereof and formed by the thin portions 88 of glass used to bond the laminate 70 together. The portions of the ferrite sections 72 between the apertures 76 and 78 of the laminate form pairs of legs 104 on opposite sides of each gap 102.

Figure 8:
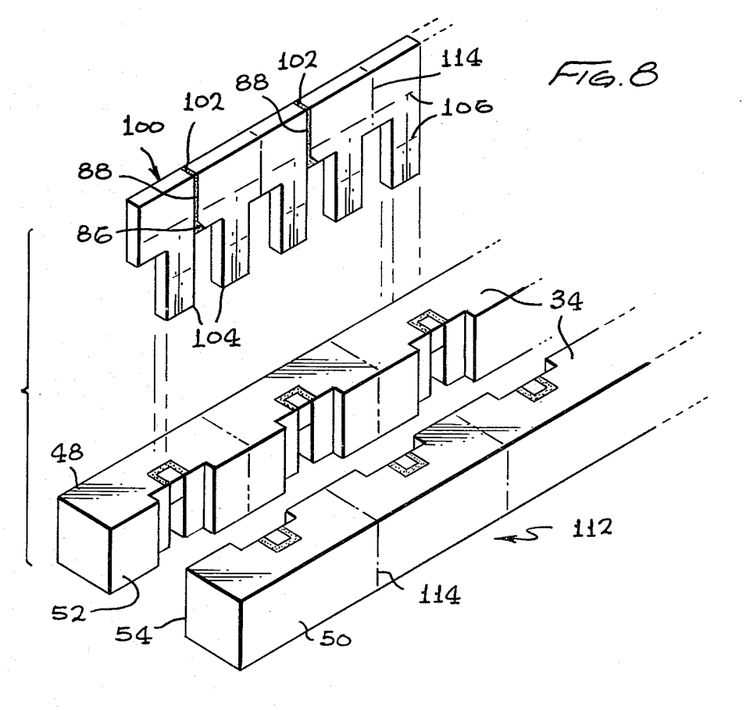
FIG. 8 is a perspective exploded view of a read/write core strip from the laminate of FIG. 7 and the opposite halves of the bisected assembly of FIG. 6 prior to bonding of the assembly halves to the opposite sides of the read/write core strip to form a multi-head assembly.

Following the slicing of the laminate 70 to form a plurality of the read/write core strips 100, each of the strips 100 is lapped and polished on its opposite sides to bring the strip 100 to a desired thickness, with suitably flat and parallel surfaces for abutting against the opposite halves 48 and 50 of the assembly 42. The opposite halves 48 and 50 are bonded to the opposite sides of the strip 100 using a very thin layer of appropriate adhesive material such as a low temperature potting glass which also flows into the apertures at the sides of the strip 100 of read/write cores formed by the grooves 62. An appropriate low temperature potting glass in this example is one having a softening point of 370° C. and a working temperature of 550° C. The opposite halves 48 and 50 are located on the sides of the core strip 100 so that each of the read/write gaps 102 will have a desired initial gap height. The assembly half 50 is bonded to the side of the core strip 100 so as to assume the approximate position shown by the dashed outline 106, with the other half 48 being bonded to the opposite side of the core strip 100 in mirror image relation. The portion of the core strip 100 protruding above the face 34 of the opposite halves 48 and 50 is then ground away until it is flush with the recording plane face 34.

The strip 100 of read/write cores and the opposite assembly halves 48 and 50 which are bonded to the opposite sides of the strip 100 thus form a multi-head assembly 112, which is then sliced into individual heads by cutting along dashed lines 114 shown in FIG. 8.

Figures 9, 10, 11, 12:
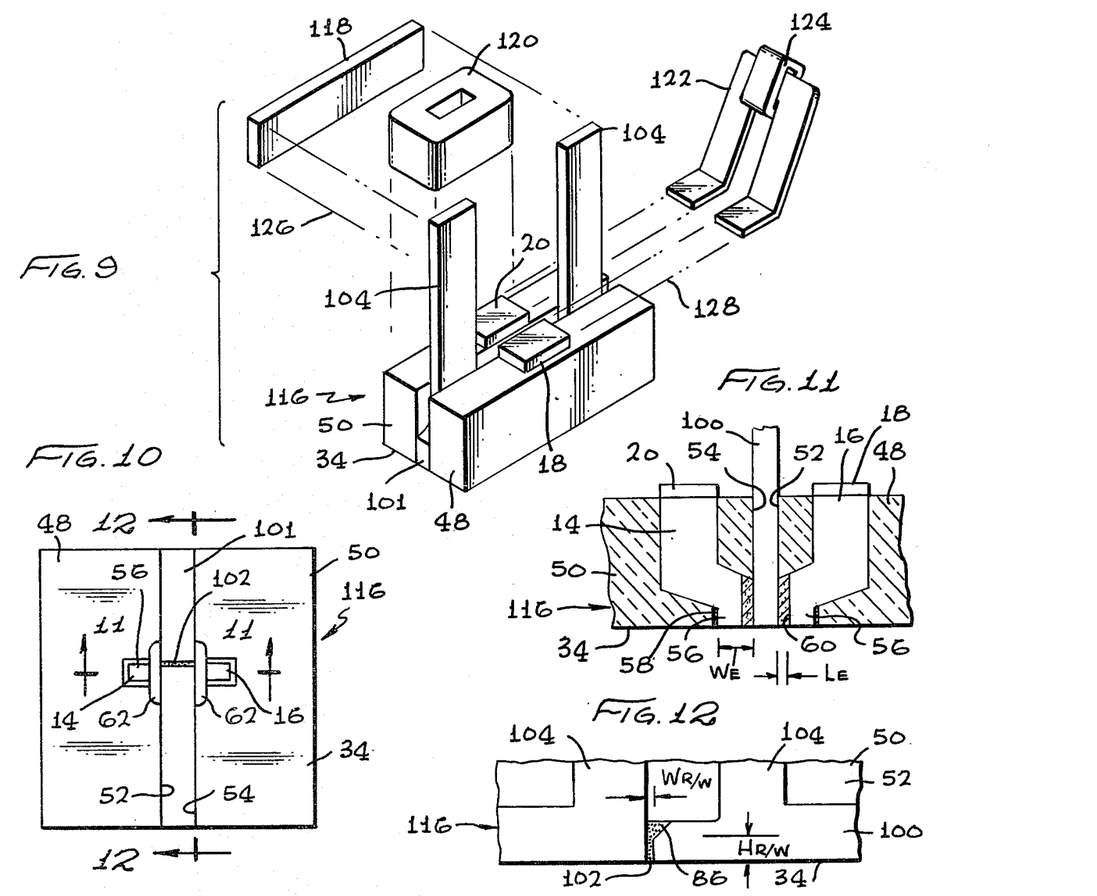
FIG. 9 is a perspective exploded view of an individual head assembly formed by slicing up the multi-head assembly of FIG. 8, together with added coils and bridging magnetic elements.
FIG. 10 is a bottom view of the magnetic head assembly of FIG. 9.
FIG. 11 is a sectional view of the assembly of FIG. 10 taken along the line 11—11 thereof.
FIG. 12 is a sectional view of the assembly of FIG. 10 taken along the line 12—12 thereof.

One such individual head assembly 116 is shown in a position inverted from that of FIG. 8 in FIG. 9. The magnetic circuit of the head assembly 116 is completed by the addition of a bar 118 of magnetic material, a coil 120 and a generally U-shaped element 122 of magnetic material having a coil 124 disposed about the central portion thereof. As shown by dashed lines 126 in FIG. 9 the magnetic bar 118 is coupled so as to extend between and complete a magnetic path between the legs 104 of a read/write core 101. The coil 120 is mounted on one of the legs 104 to provide a means for energizing the read/write magnetic circuit comprised of the core 101 and its included gap 102 and the magnetic bar 118. Energizing circuitry for the erase pole tips 56 is provided by a magnetic strap 122 and the encompassing coil 124. The opposite legs of the strap 122 are coupled to the opposite bases 18 and 20 of the arch assembly following removal of all of the bases 18 and 20 except for relatively small pads adjacent the arch legs as seen in FIG. 8. The magnetic strap 122 is moved into a position for installation on the head 116 as shown by the dashed line 128.

Thereafter, the head assembly 116 may be mounted in a plastic housing (not shown) with epoxy, following which the face 34 is lapped to provide the final gap height for the read/write gap 102 and the desired surface finish. The surface of the face 34 can be lapped to be flat, partially cylindrical, partially spherical, or otherwise contoured for air bearing effects.

The manner in which methods in accordance with the invention provide for the close control of positioning parameters can be further appreciated by referring to FIGS. 11 and 12. FIG. 11 is a cross-sectional view of the head 116 sliced through the read/write core strip 100 adjacent the gap 102 and through the erase pole pieces 56. The erase head width, designated $W_E$ in FIG. 11 is the distance between the surface of the read/write core strip 100 and the opposite surface 58 of the pole tip 56. In methods according to the invention $W_E$ is easily determined within precise tolerances by grinding the side faces 52 and 54 of the assembly halves 48 and 50 prior to bonding in place against the sides of the read/write core strip 100. Moreover, it is possible to provide for a wide range of values of $W_E$ without changing the size or design of the head assembly. This is accomplished by use of a relatively wide pole piece 22 in the arch assembly 10 so as to space the opposite surfaces 58 of the resulting pole tips 56 a substantial distance from the side faces 52 and 54 of the assembly halves 48 and 50. Relatively large dimensions for $W_E$ are set by grinding away relatively little of the surfaces 52 and 54. Conversely, relatively small values of $W_E$ are achieved by grinding away relatively large amounts of the surfaces 52 and 54. Whereas the variation in $W_E$ using prior art methods is typically $\pm 0.003''$, the variation of $W_E$ using methods in accordance with the invention is typically $\pm 0.0002''$.

As also shown in FIG. 11 the erase gap length $L_E$ is the distance between the surface of the read/write core strip 100 and the adjacent surface 60 of the pole tip 56. It will be appreciated that in methods according to the invention $L_E$ is easily and accurately determined by precision grinding of the pole piece faces along with the adjacent grooves 62 in the side faces 52 and 54 of the assembly halves 48 and 50. Whereas a typical erase gap variation using prior art techniques is on the order of 2000 microinches, the typical variation of $L_E$ using methods according to the invention is on the order of 100 microinches. Because the precision finishing and dimensioning are accomplished on relatively large parts containing multiple components and because the operations either take place on or are referenced to flat and precisely definable reference surfaces, each component part is both accurately dimensioned and correctly aligned. Because the final assembly requires only joinder of abutting flat surfaces of three parts, the possibility of misalignment is obviated.

FIG. 12 is a sectional view of the head assembly 116 of FIG. 9 showing the surface of the read/write core strip 100 opposite the assembly half 50. The read/write gap width $W_{R/W}$ is the distance between the adjacent portions of the strip 100 as determined by the thickness of glass therein. The read/write gap height $H_{R/W}$ is the distance between the face 34 and the top terminus of the thin portion of the gap 102 where the glass begins to flare out to form the fillet 86. It will be seen that $H_{R/W}$ is easily determined by finishing of the recording plane face 34.

While the invention has been particularly shown and described with reference to a preferred embodiment thereof, it will be understood by those skilled in the art that various changes in form and details may be made therein without departing from the spirit and scope of the invention.

What is claimed is:

1. The method of making a magnetic head assembly having erase heads laterally disposed relative to a read/write head in a slider member, with precise alignment and spacing of critical elements comprising the steps of:
   embedding a number of erase heads at regular spacing along the side face of a slider half member, with pole pieces of said erase heads lying substantially flush with a recording plane substantially normal to the side face;
   removing material from the side face of the slider half member to provide a planar side surface with a given lateral spacing between the furthest edge of the erase head and the planar side surface to define an erase track width;
   indenting the side face to a selected depth at each erase head to define predetermined erase gap length;
   preparing a comb-like series of read/write cores having regular spacings like those of the erase heads, the side faces of the read/write cores being planar and parallel;
   bonding a pair of complementary slider half members to the read/write cores with the side faces of the slider half members being oppositely disposed and each abutting a different side planar face of the read/write cores, and with the pole pieces of the individual erase heads being adjacent the non-magnetic gaps of the different read/write cores; and
   segmenting the assembled structure into individual head elements.

2. The invention as set forth in claim 1 above, including in addition the step of filling the indentation between the comb and the erase gap members with nonmagnetic material.

3. The invention as set forth in claim 1 above, including the step of removing material from the recording plane surface of the assembly to provide a selected read/write gap height.

4. The invention as set forth in claim 1 above, wherein the pair of slider half members are formed by bisecting a pair of serially disposed members, one of which is a nonmagnetic member having regularly spaced shaped apertures therein and the other of which is a magnetic member having a serially disposed number of arches registering within the individual apertures 5. The invention as set forth in claim 4 above, including the steps of molding the nonmagnetic and magnetic members to shape, and glass bonding them together.

6. A method of making a magnetic head assembly comprising the steps of:
providing a slider member having a row of apertures therein;
providing a plurality of arch-shaped erase core elements;
bonding each of the core elements in a different one of the apertures in the slider member to form an assembly;
bisecting the assembly along the row of apertures and through the erase core elements to form an opposite pair of assembly halves, each having a read/write core receiving surface along the bisecting plane;
processing each assembly half to provide each bisected erase core element therein with a desired thickness and gap spacing from the read/write core receiving surface;
providing a strip of read/write core elements having planar sides;
bonding the strip of read/write core elements between each of the opposite pair of assembly halves at the read/write core receiving surfaces thereof to form a multi-head assembly; and
slicing the multi-head assembly transversely to the row of apertures to form a plurality of individual head assemblies.

7. The invention set forth in claim 6, wherein the arch-shaped erase core elements each have a pole piece extending into the aperture of the slider member to lie flush with a recording plane therein, and base surface at the opposite side thereof, and further comprising the step of processing the recording plane surface of the formed assembly opposite the base to make it flat and parallel to the base surface, with a predetermined spacing, prior to bisecting the assembly.

8. The invention set forth in claim 6, further comprising the steps of:
providing a plurality of housings;
mounting each of the individual head assemblies in a different one of the housings; and
processing each of the individual head assemblies to provide a desired surface finish and desired gap height of the included portion of the read/write core element.

9. A method of making a magnetic head assembly comprising the steps of:
providing a pair of slider assembly halves, each having at least one erase core element mounted in a recess therein and abutting both a recording plane surface and a planar side face normal thereto;
removing a sufficient amount of the material of each of the slider assembly halves at the side face to provide a desired distance between the side face and the further edge of the erase core element to define an erase track width;
removing a sufficient amount of the erase core element of each slider assembly half adjacent the side face to define an erase gap length;
providing a read/write core structure having planar sides and at least one core element; and
bonding the read/write core structure between the opposing side faces of the slider assembly halves to form a head assembly.

10. The invention set forth in claim 9, wherein the step of providing a pair of slider assembly halves comprises the steps of:
providing a slider member having at least one aperture therein;
inserting at least one magnetic element having a pole piece and a pair of extending legs in the aperture in the slider member;
bonding the magnetic element in the aperture of the slider member to form a slider assembly; and
bisecting the slider assembly through the at least one pole piece of the inserted magnetic element to form the pair of slider assembly halves.

11. The invention as set forth in claim 10 above, including the further step of filling the space between the erase core elements and the side face with nonmagnetic material.

12. The invention as set forth in claim 11 above, wherein the pair of slider assembly halves includes a row of regularly spaced core elements, wherein the read/write core structure includes a row of connected individual read/write core elements, and wherein the method further comprises the step of segmenting the head assembly into individual magnetic head structures.

13. The method of batch manufacturing a plurality of magnetic recording heads, each having a read/write gap flush with a bearing surface along a recording plane and erase head elements mounted at the sides of and adjacent the read/write gap with precise alignment and gap depth, comprising the steps of:
forming a slider member having a planar surface and a row of spaced-apart apertures disposed along a longitudinal axis along the bearing surface;
forming a magnetic member having a row of arch members defining erase head elements and terminating at pole pieces lying in a common plane, with the pole pieces being registrable within the apertures of the slider member;
attaching the magnetic member to the slider member in registered relation to form a joined structure;
bisecting the joined structure along the row of apertures to form assembly halves having planar sides normal to the bearing surface;
grooving erase gap length defining channels at the pole pieces in opposed side faces of the joined structure formed by the bisecting of the jointed structure;
forming a multiple magnetic head comb structure defining a series of magnetic heads each having a read/write gap and a pair of legs extending therefrom, the comb structure having planar sides;
laminating the assembly halves to the comb structure with the comb structure interposed between the opposed side faces and the successive read/write gaps adjacent the successive pole pieces to form a unified structure; and segmenting the unified structure into individual head assemblies having slider faces and side mounted erase heads.

14. The invention as set forth in claim 13 above, including the step of removing material from the bearing surface of the joined structure to define a selected height relative to the flattened surface for the magnetic pole pieces of the erase head pieces.

15. The invention as set forth in claim 14 above, wherein the magnetic member is formed with base surfaces for the arch members opposite the pole pieces and including the step of lapping the base surfaces of the joined structure to provide a desired spacing from such base surfaces to the underside of the arch members of the magnetic member.

16. The invention as set forth in claim 15 above, comprising the further step of lapping the opposed side faces of the assembly halves to provide flat surfaces having a selected spacing from the further edges of the pole pieces.

17. The invention as set forth in claim 16 above, comprising the further step of filling the erase gap defining channels with nonmagnetic material.

18. The invention as set forth in claim 17 above, wherein the step of joining the magnetic member to the slider member comprises glass bonding about the periphery of the tips of the arch members registered within the apertures.

19. The invention as set forth in claim 18 above, comprising the further step of completing the magnetic circuits of the read/write gap and the erase head pieces.

* * * * *